Figure 1:
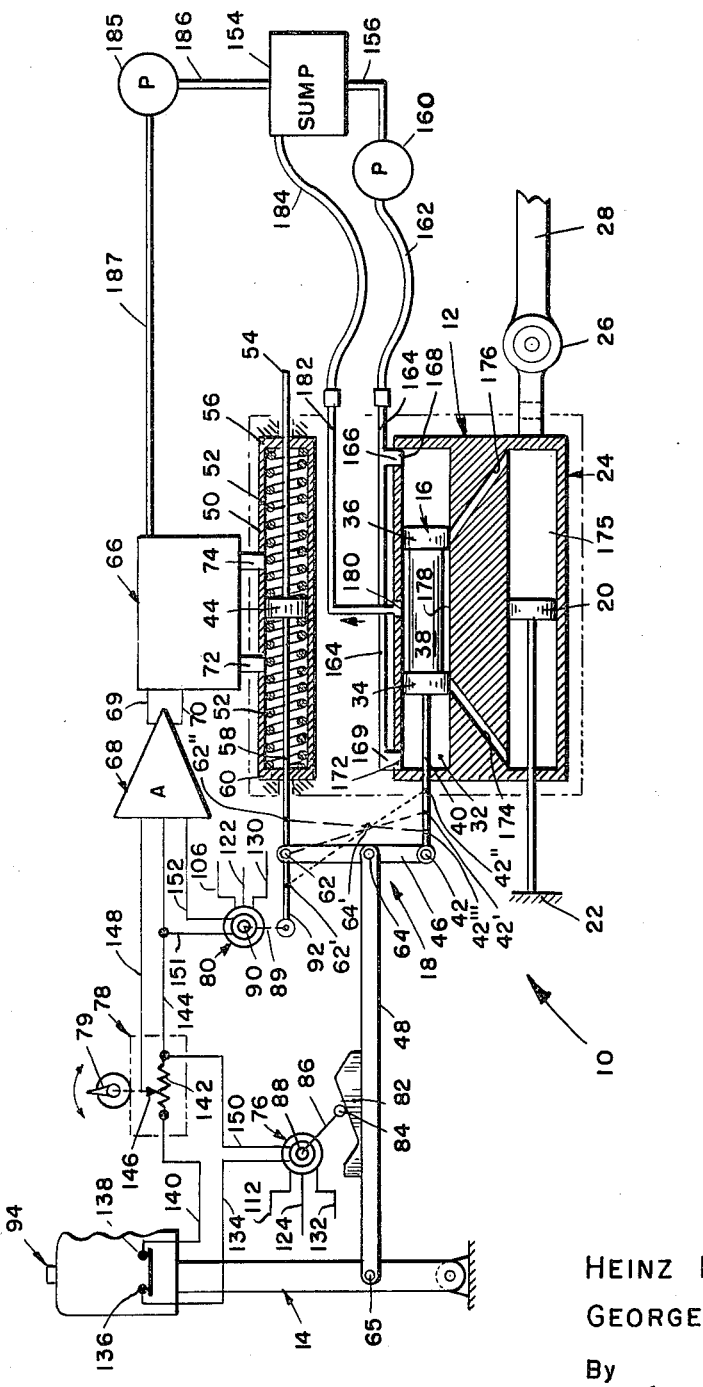

Inventors
HEINZ K. RICHTER
GEORGE E. HOWE
By
George C. Sullivan
Agent

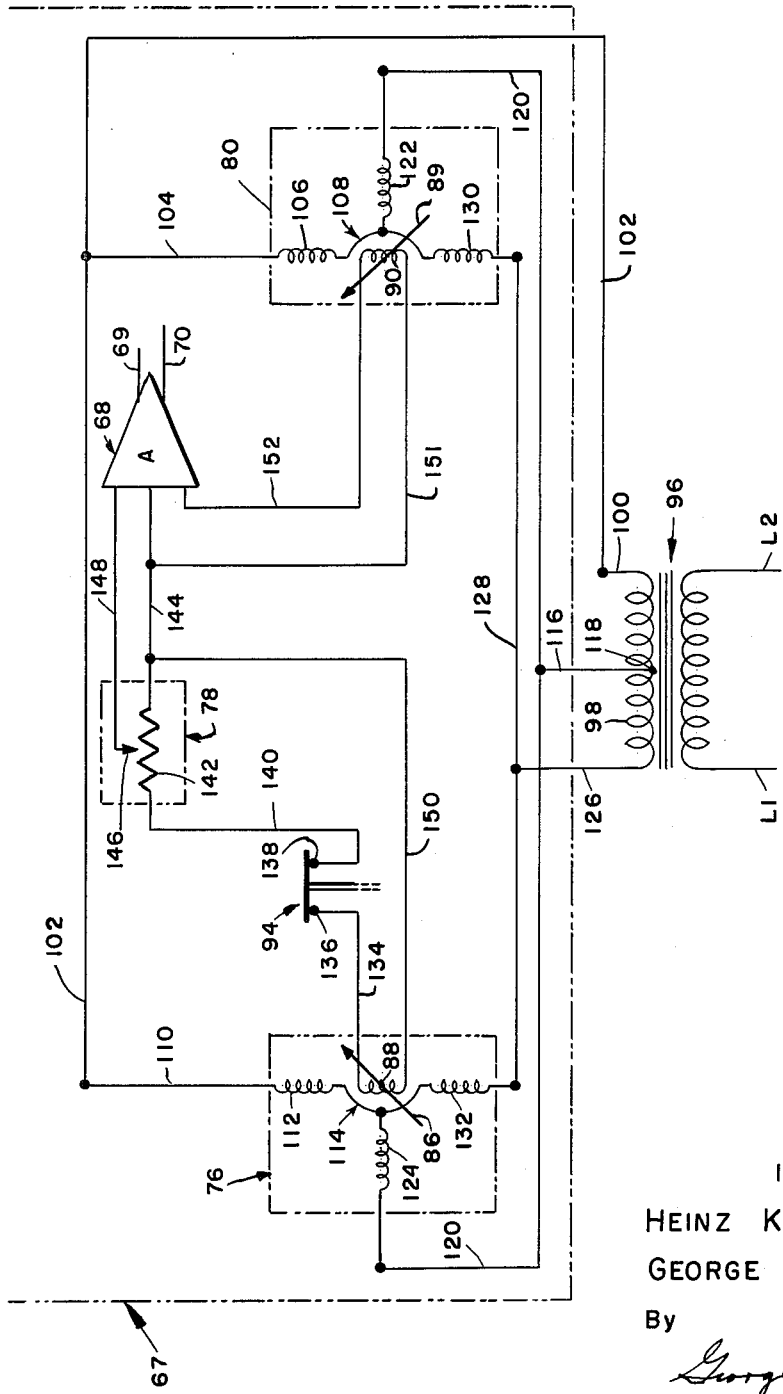

United States Patent Office 3,216,454
Patented Nov. 9, 1965

3,216,454
GAIN ADJUSTER FOR SERVOMECHANISMS
Heinz K. Richter, Los Angeles, and George E. Howe, Pacoima, Calif., assignors to Lockheed Aircraft Corporation, Burbank, Calif.
Filed July 8, 1963, Ser. No. 293,460
12 Claims. (Cl. 137—625.69)

This invention relates to servomechanisms, and more particularly to a device for adjusting the gain or varying the ratio of a servomechanism output with respect to a mechanical input.

Servomechanisms are commonly used to position aerodynamic control surfaces on conventional aircraft and to position the thrust levers to vary the thrust output of engines on VTOL (Vertical Take-off and Landing) aircraft. These servomechanisms amplify the control forces which the pilot applies to the control stick or lever, and have a given output for a given control lever input. Under certain operating conditions, it is desirable for the pilot to obtain a small control surface output from a fairly large control lever input so that the aircraft will respond fairly slowly to the movement of the control stick. At other times, the pilot may desire that the aircraft respond rapidly to a small control lever input motion. Thus, it is desirable to have means in a proportional control system whereby a pilot can change the gain of the servomechanism with respect to the pilot's input either in a positive direction or a negative direction. The gain is considered to be positive if it imparts an increased output to the servomechanism in response to a predetermined control lever input and is considered to be negative if it reduces the output of the servomechanism in response to the predetermined input.

It is known to adjust the gain on a servomechanism in an aircraft with mechanical means which physically changes the amount of net effective throw of the control stick. This is usually done by turning a crank which is connected to the control lever linkage. Although generally satisfactory, such means for adjusting the gain of a servomechanism do have certain disadvantages.

One disadvantage resides in the fact that it is very difficult to place the adjustable component in close proximity to the pilot.

Another disadvantage resides in the fact that the response of the gain adjusting system is so slow that the pilot cannot quickly evaluate the effect of the change in terms of system output to quickly and efficiently reach optimum values.

Yet another disadvantage resides in the fact that the pilot is unable to quickly change the control lever input-to-servomechanism output ratio to cope with changes in the servo-mechanism system, the environment in which the aircraft is flying, and the controlled function.

A still further disadvantage resides in the fact that the pilot is unable to move from one value of gain to another without passing through intervening values.

In view of the foregoing factors and conditions characteristic of gain adjusters for adjusting the gain of servomechanisms, it is a primary object of the present invention to provide a new and improved gain adjuster for a servomechanism not subject to the disadvantages enumerated above and having a signal-operated gain adjuster for adjusting the gain on a servomechanism safely, efficiently and expeditiously.

Another object of the present invention is to provide a gain adjuster for a hydraulic servomechanism on an aircraft wherein the adjustable component is readily accessible to the pilot.

Yet another object of the present invention is to provide a gain adjuster for a servomechanism wherein an operator of the gain adjuster may move from one value of gain to another without passing through intermediate values.

A further object of the present invention is to provide a gain adjuster for a servomechanism which may be operated electrically to vary the ratio of system output to system input.

A still further object of the present invention is to provide a gain adjuster for the servomechanism of an aircraft having means located on the aircraft control lever which permits the pilot to readily bypass the gain adjustment system.

Another object of the present invention is to provide a gain adjuster for a hydraulic servomechanism having a modulating piston wherein the displacement of the modulating piston is related to the displacement of an aircraft control lever by a function readily adjusted by the pilot.

Another object of the present invention is to provide a gain adjuster for hydraulic servomechanisms which includes a synchro-transmitter mechanically driven by the control lever to produce a voltage related to the displacement of the control lever by a predetermined function.

According to the present invention, a hydraulic servomechanism includes a spool valve which is positionable for directing hydraulic fluid to a power piston to amplify an input force which the pilot applies to an aircraft control lever. The control lever is connected to the spool valve which is normally moved a predetermined amount responsive to a predetermined amount of movement of the control lever. The extent of movement of the spool valve, however, is readily adjusted by a gain adjuster having linkage means connecting the control lever to the spool valve. The linkage means is positionable to vary the amount of movement of the spool valve in response to the predetermined throw of the control lever. Positioning means are connected to the linkage means for positioning the linkage means in response to a signal. Signal-generating means connects the positioning means to the control lever and generates a predetermined signal for each increment of throw of the control lever. The signal-generating means is readily adjusted by means located in close proximity to the pilot. Either of two gain functions can be selected very quickly by the pilot by means of an electrical switch which is located on the control lever or be subject to a continuous automatic control. The closed position of the switch places the signal-generating means in a circuit with the positioning means to cause the adjustable gain function to take place. When the electrical switch is opened, the signal-generating means is disconnected from the control lever and the positioning means locks at the center of its stroke to fix a normal pivot point for the control lever so that the predetermined throw of the control lever produces the normal amount of movement of the spool valve.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a schematic view, with certain parts shown in cross-section, of a gain adjuster of the present invention; and FIGURE 2 is a wiring diagram of the electrical components of the device of FIGURE 1.

Referring to the drawings in more particularity, the gain adjuster of the present invention, generally designated 10, includes a hydraulic servomechanism 12 which is capable of employment in an aircraft to position an aerodynamic control surface or other aircraft components in response to an input motion imparted by an aircraft control lever 14. The servomechanism 12 includes a spool valve 16 which is positionable by control lever 14 through intervening linkage means 18 to direct hydraulic fluid under pressure to a power piston 20. The power piston 20 is anchored at 22 so that the pressurized hydraulic fluid will cause the housing 24 of servomechanism 12 to move with respect to the power piston 20. An eyebolt 26 is attached to the housing 24 and a tie rod 28 is pivotally connected to the eyebolt 26. The tie rod 28 is employed to connect the servomechanism 12 to an aircraft aerodynamic control surface or other aircraft component, not shown, to be actuated by the servomechanism 12.

The spool valve 16 is slidably mounted in a spool valve chamber 32 in servomechanism housing 24. The valve 16 includes a pair of lands 34 and 36 conformed to the shape of chamber 32 at its ends and a cylindrical midsection 38 of reduced diameter. A rod 40 is affixed to the spool valve 16, extends through an end wall 41 of chamber 32 and is pivotally connected to the linkage means 18 with a pin 42.

The linkage means 18, which is shown as a semi-schematic representation for clarity of visualization, comprises a modulating piston 44, a first link 46, a second link 48, and rods 54 and 58. In practice conventionally utilized idler links are utilized to obviate binding which would otherwise result from linkage movement. The modulating piston 44 is reciprocally mounted in a structurally fixed hydraulic cylinder 50 and is normally maintained at the mid-point of the cylinder 50 by a pair of compression springs 52 which are preloaded to so position the piston 44. The first rod portion 54 is affixed to one side of modulating piston 44 and extends through an end wall 56 of cylinder 50. The second rod portion 58 is attached to the other side of the modulating piston 44 and extends through the other end wall 60 of cylinder 50. Alternatively, a single rod extending through the piston may be provided. The second rod 58 is pinned to the first link 46 with a pin 62 at its end remote from the pin 42. The second link 48 is pinned intermediate of the ends of the first link 46 with a pin 64 and to the control lever 14 with a pin 65. When the modulating piston 44 is in its normal position at the center of cylinder 50, a predetermined amount of throw of the control lever 14 pivots link 46 about pin 62 and imparts a predetermined amount of movement to the spool valve 16. If, however, the modulating piston 44 is moved from its center position in cylinder 50, the pivot point established at pin 62 on link 46 will shift laterally, thereby changing the amount of movement imparted to the spool valve 16 by the predetermined throw of control lever 14. For example, should sufficient throw be imparted to the lever 14 to swing link 46 about pivot point 62 and move the pin 64 to a position indicated by 64', the pin 42 will be moved laterally to a position indicated by the numeral 42'. The spool valve 16 will move an amount represented by the length of the line connecting points 42 and 42'. If, on the other hand, the modulating piston 44 is moved within housing 50 to position pivot point 62 laterally to a position indicated by the numeral 62', then the throw of lever 14 which moves pin 64 to the position indicated by the numeral 64' will cause pin 42 to move laterally to the position indicated by the numeral 42''. This causes spool valve 16 to move an amount represented by the line 42–42''. Conversely, positioning the modulating piston 44 in the opposite direction so that pivot point 62 shifts to the position indicated by the numeral 62'' will result in less movement of spool valve 16 because the same predetermined throw of control lever 14 which moves pin 64 to point 64' only moves the pin 42 to the position indicated by the numeral 42'''. Therefore, the ratio of servomechanism output-to-control lever input or system gain may be changed in either a positive direction or a negative direction by changing the position of modulating piston 44 as described above.

A positioning means 66 is provided for changing the position of modulating piston 44. It comprises a conventional electro-hydraulic transfer valve or an autopilot control valve of the type shown and described in Patent No. 2,738,772. The positioning means or transfer valve 66 is operable responsive to electric signals received from an electric-signal generating means 67 (FIGURE 2) including an amplifier 68. Signals from the amplifier 68 pass through leads 69 and 70 to the valve 66 to control the admission of hydraulic actuating pressure to the lines 72 and 74 leading into the hydraulic cylinder 50 on either side of the piston 44.

The signal-generating means 67 also includes a synchro-transmitter 76 which is mechanically driven by the control lever 14 to produce a voltage proportional to the displacement of the control lever. The voltage produced by the synchro-transmitter 76 is attenuated by a potentiometer 78 to an extent dictated by the pilot's setting of potentiometer control knob 79. The attenuated voltage is applied to the amplifier 68 which actuates the electro-hydraulic transfer valve 66, forcing the modulating piston 44 to move until such time as an interconnected feedback synchro-transmitter 80 produces a voltage equal to the voltage from the potentiometer 78. The displacement of modulating piston 44 is, in this way, related to the displacement of control lever 14 by a function readily adjustable by the pilot through his manipulation of control knob 79.

The synchro-transmitter 76 is mechanically driven by control lever 14 through a cam 82 which is affixed to the second link 48. A cam follower 84 is rotatably mounted on an arm 86. Responsive to cam follower movement the arm 86 positions the rotor 88 (FIGURE 2) of the synchro-transmitter 76.

The feedback transmitter 80 includes an arm 89 which is pivotally connected to the first link 46 by means of a rod 92, for positioning its rotor 90 (FIGURE 2).

A push-button type switch 94 is mounted on the control lever 14 in such a manner that this switch normally closes the electrical circuit, to be hereinafter described, to the amplifier 68. When switch 94 is opened by depressing the button, the signal-generating means 67 and the transfer valve 66 are de-energized. The modulating piston 44 is thereby locked in its normally centered position within cylinder 50 by the compression spring 52 so that the control lever 14 will have its normal gain. Thus, either of two gain functions can be selected very quickly by means of the switch 94. The closed position of the switch introduces the adjustable gain function previously described and the open position of the switch makes the system gain a function of the mechanical link 46.

Referring now more particularly to FIGURE 2, power is supplied to the electric-signal generating means 67 through a center-tap transformer 96 having leads L1 and L2 which may be connected to a suitable A.-C. voltage, not shown. The transformer 96 includes a secondary winding 98 having one end 100 connected to a header 102. A lead 104 connects the header 102 to a first leg 106 of the Y-connected winding 108 of feedback transmitter 80. A lead 110 connects the header 102 to a first leg 112 of the Y-connected winding 114 of the synchro-transmitter 76. A lead 116 connects the center tap 118 of the secondary winding 98 to a header 120 which connects a second leg 122 of winding 108 to a second leg 124 of winding 114. A lead 126 connects the other end of secondary winding 98 to a header 128 which connects a third leg 130 of winding 108 to a third leg 132 of winding 114.

The rotor 88 of transmitter 76 is connected by a lead 134 to a contact 136 on one side of the push-button switch 94. The other contact 138 of switch 94 is connected through a lead 140 to the resistance element 142 of potentiometer 78. The resistance element 142 is connected to the amplifier 68 through a lead 144 and the movable slide wire 146 is connected to the amplifier 68 through a lead 148. A lead 150 connects the rotor 88 to the lead 144 between the resistance element 142 and the amplifier 68. A lead 151 similarly connects the rotor 90 of feedback transmitter 80 to the lead 144 between the resistance element 142 and the amplifier 68 and a lead 152 connects the rotor 90 directly to the amplifier 68.

Referring now to FIGURE 1, hydraulic fluid under pressure is supplied to the spool valve chamber 32 from a sump 154 through a first line 156, a pump 160, a flexible hose 162 and a conduit 164. A first branch line 166 connects the conduit 164 to an inlet port 168 in the housing 24 on one side of spool valve 16 and a second branch line 169 connects the conduit 164 to an inlet port 172 in housing 24 on the other side of the spool valve 16.

A first passageway 174 connects the spool valve chamber 32 with a power piston chamber 175 on one side of the power piston 20 and a second passageway 176 connects the spool valve chamber 32 with the power piston chamber 175 on the other side of power piston 20. When the spool valve 16 is displaced to the right, as viewed in FIGURE 1, so that land 34 moves from its position normally blocking flow of fluid through passageway 174, fluid under pressure flows from the spool valve chamber through passageway 174 into the power cylinder chamber 175 on the lefthand side of the power piston, as viewed in FIGURE 1. At the same time, the land 36 on the spool valve 16 uncovers the passageway 176 so that return fluid may flow from the power cylinder chamber 175 on the right-hand side of the power piston 20 up through the passageway 176 into a return passageway 178 formed between the reduced-diameter mid-portion 38 of the spool valve 16 and the inner wall of the spool valve chamber 32. The return fluid then flows out through an outlet port 180, a return line 182 and a flexible hose 184 to the sump 154.

A pump 185 withdraws hydraulic fluid from the sump 154 through a line 186 and discharges the hydraulic fluid under pressure to the transfer valve 66 through a line 187.

Operation of the device is readily understandable. The control knob 79 is positioned so that the potentiometer 78 attenuates the voltage from the synchrotransmitter 76 to the extent dictated by the pilot's needs. Then, as the control lever 14 is moved, the synchro-transmitter 76 produces a voltage proportional to the displacement of the control lever 14. The amplifier 68 actuates the electro-hydraulic transfer valve 66 which forces the modulating piston 44 to move until the feedback synchrotransmitter 80 produces a voltage equal to the voltage from the potentiometer 78. The displacement of the modulating piston 44 is, in this way, related to the displacement of the control lever 14 by a function readily adjustable by the pilot. Movement of the modulating piston 44 changes the lateral position of the pivot point 62 and, assuming that it moves laterally to the point indicated by the numeral 62', then an input applied to the control lever 14 causing the pin 64 to move laterally to the point indicated by reference numeral 64' will result in a displacement of the pin 42 to the point indicated by the numeral 42". Control lever 14 swings the first link 46 about the pivot point 62 causing the spool valve 16 to slide to the right, as viewed in FIGURE 1. This uncovers the first passageway 174 so that hydraulic fluid under pressure may flow from the spool valve chamber 32 through the first passageway 174 into the power piston chamber 175 on the left-hand side of the power piston 20. Since the piston 20 is anchored and the hoses 162 and 184 form a flexible connection with servomechanism 12, the force exerted on the left-hand side of the power piston 20 will cause the housing 24 to move to the left, displacing the eyebolt 26. The right-hand side of the power piston chamber 175 is exhausted through the second passageway 176, the return chamber 178 and the outlet port 180 to the sump 154. If the pilot desires less gain, he may position the control knob 79 to reduce the voltage from the synchrotransmitter 76.

While the particular gain adjuster herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

We claim:
1. In combination with a servomechanism having an input-force receiving element which is movable to actuate an output-force amplifying element, said input-force receiving element being moved a predetermined amount by an input-force transmitting lever having a predetermined throw, a gain adjuster comprising:
  (a) linkage means connecting said lever to said input-force receiving element;
  (b) positioning means connected to said linkage means for varying the movement of the linkage means to change the movement of said input-force receiving element in response to said predetermined throw of said lever; and
  (c) signal generating means actuated by said lever for transmitting said predetermined signal to said positioning means.

2. In combination with a hydraulic servomechanism having a spool valve movable to direct hydraulic fluid to a power piston, said spool valve being moved a predetermined amount by a control lever having a predetermined throw, a gain adjuster comprising:
  (a) linkage means connecting said control lever to said spool valve;
  (b) positioning means connected to said linkage means for varying the movement of the linkage means to change the movement of said spool valve in response to said predetermined throw of said control lever; and
  (c) signal generating means actuated by said control lever for transmitting said predetermined signal to said positioning means.

3. In combination with a hydraulic servomechanism having a spool valve movable to direct hydraulic fluid to a power piston, said spool valve being moved a predetermined amount by a control lever having a predetermined throw, a gain adjuster comprising:
  (a) linkage means connecting said control lever to said spool valve;
  (b) positioning means connected to said linkage means for varying the amount of movement of the linkage means to change the movement of said spool valve in response to said predetermined throw of said control lever; and
  (c) electric-signal generating means connecting said positioning means to said control lever, said signal generating means generating a predetermined electrical signal for each increment of throw of said control lever.

4. In combination with a hydraulic servomechanism having a spool valve movable to direct hydraulic fluid to a power piston, said spool valve being moved a predetermined amount by a control lever having a predetermined throw, a gain adjuster comprising:
  (a) linkage means connecting said control lever to said spool valve, said linkage means including a piston including a movable pivot point to vary said predetermined amount of movement of said spool valve in response to said predetermined throw of said control lever;

(b) electrically actuated valve means connected to said piston for directing fluid to said piston in response to an electrical signal, said piston being positioned by said fluid; and (c) electric-signal generating means connecting said valve means to said control lever, said signal generating means generating a predetermined electrical signal to actuate said valve a predetermined amount for each increment of throw of said control lever.

5. In combination with a hydraulic servomechanism having a spool valve movable to direct hydraulic fluid to a power piston, said spool valve being moved a predetermined amount by a control lever having a predetermined throw, a gain adjuster comprising:

(a) linkage means connecting said control lever to said spool valve, said linkage means being positionable to vary said predetermined amount of movement of said spool valve in response to said predetermined throw of said control lever;

(b) positioning means connected to said linkage means for positioning said linkage means in response to an electrical signal; and (c) electric-signal generating means connecting said positioning means to said control lever, said signal generating means including a synchro-transmitter engaging a cam on said control lever and generating a predetermined electrical signal for each increment of throw of said control lever.

6. Apparatus for varying the ratio of a hydraulic servomechanism output to an input applied thereto, said servomechanism having a spool valve movable to direct hydraulic fluid to a power piston, said spool valve being moved a predetermined amount by a control lever having a predetermined throw, said apparatus comprising:

(a) linkage means connecting said control lever to said spool valve, said linkage means including a movable pivot point to vary said predetermined amount of movement of said spool valve in response to said predetermined throw of said control lever;

(b) positioning means connected to said linkage means for varying the amount of movement of the linkage means to change the effective movement between the control lever and the spool valve; and (c) electric-signal generating means connecting said positioning means to said control lever, said signal generating means generating a predetermined electrical signal for each increment of throw of said control lever.

7. The apparatus of claim 6 including electrical feedback means connected to said linkage means and to said signal generating means to interrupt the signal to said positioning means when said linkage means has been moved to a predetermined position by said positioning means.

8. The apparatus of claim 6 wherein said linkage means comprises:

(a) a modulating piston reciprocally mounted in a hydraulic cylinder, said modulating piston having a tail rod;

(b) spring means centering said modulating piston in said cylinder;

(c) a first link having one end pivotally connected to said tail rod and its other end pivotally connected to said spool valve; and (d) a second link having one end pivotally connected to said first link intermediate its ends and another end pivotally connected to said control lever, said spool valve being moved said predetermined amount by said predetermined throw of said control lever when said modulating piston is centered in said cylinder, said predetermined amount of movement of said spool valve being varied when said modulating piston is moved off-center in said cylinder.

9. The apparatus of claim 8 wherein said positioning means comprises an electro-hydraulic transfer valve connected to said hydraulic cylinder for directing pressurized fluid thereto when actuated by said electrical signal.

10. The apparatus of claim 9 wherein said electric-signal generating means comprises:

(a) a cam mounted on said second link; and (b) a synchro-transmitter having a rotor in driving engagement with said cam, said rotor being connected to said transfer valve for transmitting a voltage thereto in response to movement of said rotor by said cam.

11. The apparatus of claim 10 including a potentiometer connected to said rotor for attenuating the voltage transmitted, and a feedback transmitter having a rotor driven by said modulating piston for producing a voltage equal to said attenuated voltage, said rotor being connected to said amplifier and said potentiometer.

12. The apparatus of claim 11 including an electric switch mounted on said control lever and connected in a circuit with said potentiometer for opening the circuit to said transfer valve.

References Cited by the Examiner
UNITED STATES PATENTS

| 2,877,968 | 3/59 | Granan et al. | 91—367 X |
| 2,939,653 | 6/60 | Rasmussen et al. | 91—363 X |
| 2,990,145 | 6/61 | Hougland | 91—363 X |

M. CARY NELSON, *Primary Examiner.*

HENRY T. KLINKSIEK, *Examiner.*